(No Model.)
M. PFATISCHER.
DISTRIBUTION OF ELECTRICITY BY SECONDARY BATTERIES.
No. 402,349. Patented Apr. 30, 1889.
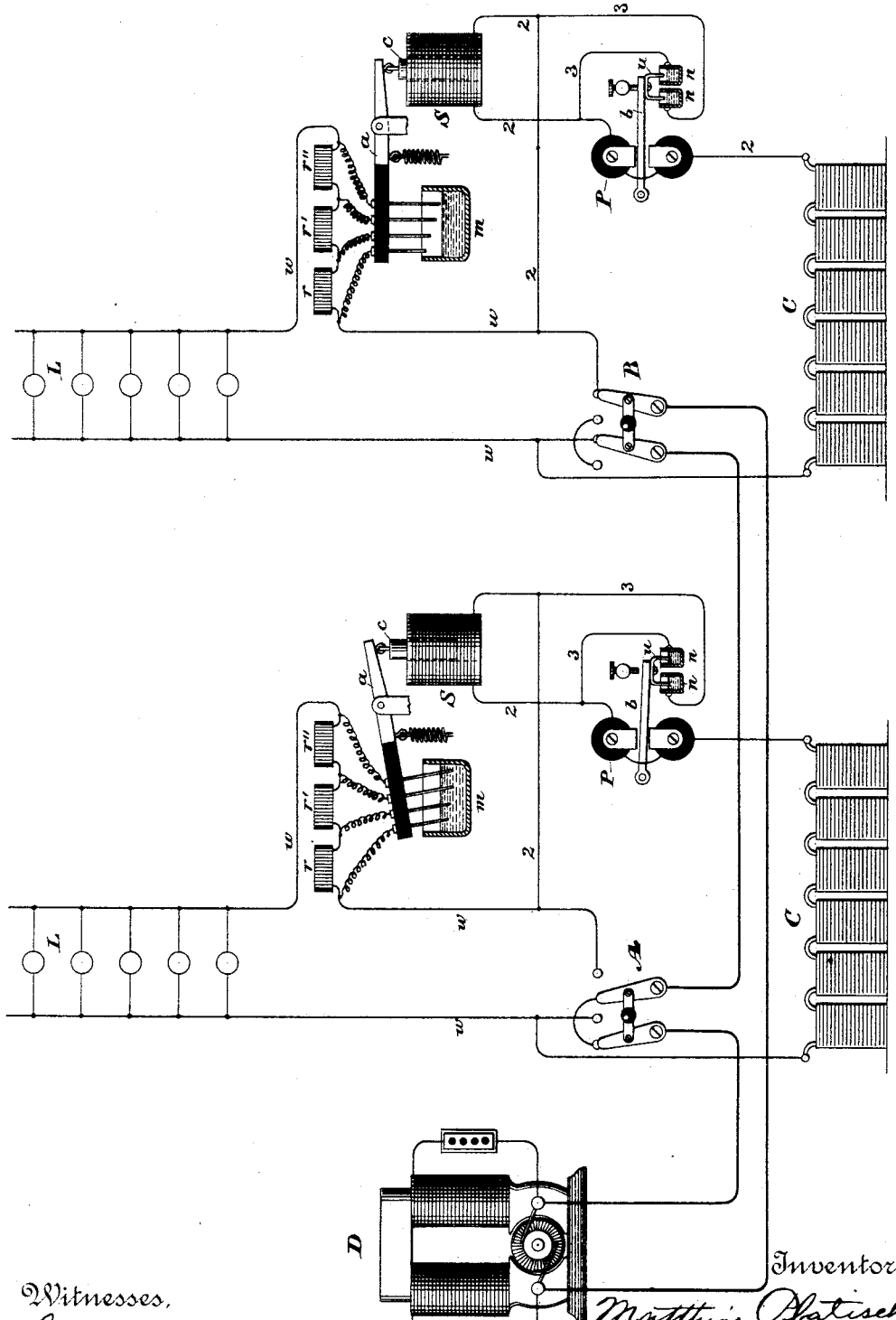
Witnesses.
Geo. W. Breck
Carrie E. Ashley
Inventor,
Matthias Pfatischer
By his Attorney Wm. B. Nansig

UNITED STATES PATENT OFFICE.

MATTHIAS PFATISCHER, OF NEW YORK, N. Y., ASSIGNOR TO THE ELECTRICAL ACCUMULATOR COMPANY, OF NEW YORK.

DISTRIBUTION OF ELECTRICITY BY SECONDARY BATTERIES.

SPECIFICATION forming part of Letters Patent No. 402,349, dated April 30, 1889.

Application filed November 2, 1888. Serial No. 289,834. (No model.)

*To all whom it may concern:*

Be it known that I, MATTHIAS PFATISCHER, a subject of the Emperor of Germany, residing in the city, county, and State of New York, have invented a certain new and useful Improvement in the Distribution of Electricity by Secondary Batteries, of which the following is a specification.

My invention is an improvement in the distribution of electricity by secondary batteries.

The object of my invention is to maintain a constant difference of potential at the lamp-terminals in the working-circuit supplied by the battery, and to do this whether the dynamo is charging the battery or is disconnected therefrom.

The distributing system employed by me consists of a dynamo located at a central station, a series of sub-stations at each of which is located a secondary battery, and a series of translating devices—as lamps—in a working-circuit connected to the battery. There is a charging-circuit connecting the dynamo and sub-stations. At each sub-station there is a switch to include and exclude the battery with respect to the charging-circuit. The number of cells of battery employed at each sub-station must be sufficient to properly supply the lamps, and it occasionally happens that when the lamps are being supplied by the battery at a sub-station the dynamo is operating to charge the battery. To do this, the electro-motive force is raised above the electro-motive force of the battery, and this excessive electro-motive force is noticeable in its effect at the lamp-terminals. Especially is this true as the battery nears full charge, when the excessive electro-motive force of the dynamo operates most injuriously to shorten the life of the lamps.

My improvement is directed to obviate this difficulty; and it consists in apparatus for automatically introducing and withdrawing an artificial resistance by effects due to the presence or absence of the dynamo-current.

In the main lead between battery and lamps I place a sectional resistance and a suitable switch for inserting and withdrawing it to a greater or less extent. This switch is controlled by an electro-magnet located in circuit in close proximity to the battery between the dynamo and battery and between the battery and lamps. A polarized electro-magnet is arranged in circuit close to this magnet and in the same relative position. This polarized magnet operates a switch in a shunt-circuit round the first-named magnet. When a current is flowing from the dynamo, both magnets are in circuit, and a portion of the resistance is inserted. When current is flowing from the battery, it reverses the position of the polarized switch and cuts the resistance out of circuit by short-circuiting the magnet which controls such resistance.

The accompanying drawing illustrates my invention.

D is a dynamo located at the central station. There is a series of sub-stations, at each of which is located a series of cells of secondary battery, C. These batteries are in working-circuits $w$, in which are also included translating devices—such as lamps L—to be supplied by the battery. There are switches at each sub-station A and B for including and excluding the batteries and working-circuit with respect to the charging-circuit.

The batteries are placed between the main leads of the working-circuit $w$ in a branch circuit, 2. In the same branch 2 is a neutral electro-magnet, preferably in the form of a solenoid, S. In the same branch 2 there is also a polarized electro-magnet, P, in the same relative position, where it receives both the current of charge and the current of discharge. The magnet S has a pivoted armature-bar, $a$. To one end of bar $a$ is connected the solenoid-core $c$. The opposite end of bar $a$ carries a series of insulated electrical contacts of respectively different lengths dipping into a mercury-cup, $m$. In the working-circuit $w$ there is a series of sectional artificial resistances $r\ r'\ r''$. The terminals of this series of resistances are connected to the series of insulated contacts respectively.

The polarized magnet P has an armature, $b$, at the free end of which there is a circuit-breaker, consisting of a pair of mercury-cups, $n\ n$, and a U-shaped contact, $u$. This circuit-breaker is in a shunt-circuit, 3, round the coils of solenoid S. When this circuit-breaker is closed, solenoid S is practically out of circuit. When it is open, solenoid S is in circuit.

Two sub-stations are illustrated. At one station the switch B is in position to cut the battery into the charging-circuit. At the other the switch A is in position to remove the battery from the charging-circuit.

The apparatus operates as follows: We may assume that current is flowing from dynamo D in the charging-circuit continuously. At the first station the switch A is in position to remove the battery from circuit. Current is flowing from battery C through magnet P in branch circuit 2, through shunt-circuit 3 into the working-circuit $w$ and supplying lamps L. Magnet S, being practically cut out of circuit by the closing of shunt-circuit 3, is demagnetized, its armature is retracted, the series of insulated contact-points are dipping into the mercury in cup $m$ and forming a cut-out round all the artificial resistances. The resistance in the working-circuit is therefore normal and the proper difference of potential is manifested at the lamp-terminals. At the second station, however, the battery is cut into the charging-circuit. Current is therefore flowing from the charging-circuit into the battery a direction the reverse of that which would obtain if the battery were itself furnishing current. The polarized magnet P has carried its armature to the opposite extreme, breaking shunt-circuit 3 at $n\ n$. Solenoid S is in circuit 2 and its core $c$ is drawn down, the opposite end of the bar $a$ is elevated, and the series of insulated contacts are withdrawn from the mercury. The resistances $r\ r'\ r''$ are therefore cut into circuit. It is to be understood that the battery C when charged yields an electro-motive force sufficient to raise lamps L to the proper candle-power. The dynamo, in order to charge this battery, must have an electro-motive force in excess of that yielded by the battery. If this be connected into the battery to charge it, this excessive electro-motive force will pass the terminals of the battery and be manifested at the lamp-terminals. Suppose the lamps are one-hundred-and-ten-volt lamps and the battery yields one hundred and ten volts. To charge the battery, I must use a current of at least one hundred and twenty volts. If lamps be connected, they will be supplied by a portion of this current passing the battery-terminals; but one hundred and twenty volts will cause a breakage of the lamp filaments. I therefore introduce a resistance, $r\ r'$, in the lead $w$ sufficient in amount to cause a drop of ten volts, and this I do automatically by the arrangement of apparatus above described.

The resistances $r\ r'\ r''$ should be properly proportioned to produce a drop in electro-motive force between the battery and lamps in amount equal to the amount by which the electro-motive force of charge exceeds the electro-motive force of discharge.

What I claim, and desire to secure by Letters Patent, is—

1. The combination of a dynamo-electric machine, a charging-circuit, a secondary battery, a working-circuit containing a series of translating devices in multiple arc with the battery, an artificial resistance in the working-circuit between the battery and translating devices, a switch or circuit-changer for inserting and withdrawing said resistance, an electro-magnetic device located in said circuit controlling said switch, and a polarized electro-magnet located in a branch circuit between the dynamo and battery and between the battery and lamps operating to control the first-named magnet, substantially as described.

2. The combination of a dynamo-electric machine, a charging-circuit, a secondary battery, a working-circuit containing a series of translating devices in parallel circuit with the battery, a series of artificial resistances to be inserted and withdrawn with respect to the working-circuit between the battery and translating devices, a switch or circuit-changer for inserting and withdrawing said resistances successively, an electro-magnetic device located in said circuit controlling said switch, and a polarized electro-magnet located in a branch circuit between the dynamo and battery and between the battery and translating devices operating to control the first-named magnet, substantially as described.

MATTHIAS PFATISCHER.

Witnesses:
DANIEL E. DELAVAN,
WILLIAM H. SHOURDS.